United States Patent
Murakami

(10) Patent No.: US 7,643,166 B2
(45) Date of Patent: Jan. 5, 2010

(54) IMAGE FORMING APPARATUS, IMAGE FORMING METHOD AND PRINTING APPARATUS

(75) Inventor: Waki Murakami, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 11/398,212

(22) Filed: Apr. 5, 2006

(65) Prior Publication Data

US 2006/0227357 A1    Oct. 12, 2006

(30) Foreign Application Priority Data

Apr. 6, 2005    (JP)    .............................. 2005-109835

(51) Int. Cl.
*H04N 1/40*    (2006.01)
(52) U.S. Cl. ..................... 358/1.15; 358/468
(58) Field of Classification Search .................. 358/1.9, 358/2.1, 1.15, 1.16, 1.17, 1.18, 468; 382/173, 382/180
See application file for complete search history.

(56) References Cited

U.S. PATENT DOCUMENTS 6,574,003 B1 *    6/2003    Kakuno ..................... 358/1.13
2008/0074685 A1 *    3/2008    Sakamoto ................... 358/1.9

FOREIGN PATENT DOCUMENTS

JP    4-170686 A    6/1992
JP    10-021018 A    1/1998

* cited by examiner

*Primary Examiner*—Thomas D Lee
*Assistant Examiner*—Stephen M Brinich
(74) *Attorney, Agent, or Firm*—Canon U.S.A., Inc. I.P. Division

(57) ABSTRACT

An image forming apparatus that converts page description language to page description language corresponding to a plurality of areas; generates image data based on the converted page description language; retains the converted page description language and the generated image data; compares the retained page description language and the converted page description language; and selects one of the generated image data and the retained image data, depending on the comparison result.

18 Claims, 7 Drawing Sheets

FIG.4

48 112 moveto
48 16 lineto
120 40 lineto
48 112 lineto
closepath
1 0 0 setrgbcolor
fill
showpage

FIG.5

16 16 moveto
16 0 lineto
32 0 lineto
16 16 lineto
closepath
1 0 0 setrgbcolor
fill
showpage

FIG.6

16 32 moveto
16 0 lineto
32 0 lineto
32 32 lineto
16 32 lineto
closepath
1 0 0 setrgbcolor
fill
showpage

FIG.7

48 16 moveto
48 0 lineto
64 0 lineto
48 16 lineto
closepath
1 0 0 setrgbcolor
fill
showpage

IMAGE FORMING APPARATUS, IMAGE FORMING METHOD AND PRINTING APPARATUS

BACKGROUND OF THE INVENTION

1. Field of the Invention

The present invention relates to an image forming apparatus, an image forming method, and a printing apparatus that generate image data by analyzing print data described in PDL (page description language) and the like.

2. Description of the Related Art

The image data generation for printing typically includes: 1) vector image processing for analyzing print data such as Post Script or PDL transmitted from a print driver and the like; and 2) raster image processing such as rotation and color conversion.

When print data described in PDL is input, the image forming apparatus analyzes the print data, and generates and outputs image data of compressed format or raster image data of each page. The image data to be input is expressed as a group of a plural kinds of objects (rendering objects). The objects include graphics, and texts.

After the image processing is performed such as converting colors, compositing and rotating pages as required, an image outputted by the image forming apparatus is transmitted to an image output module, and becomes printable. The page image data immediately before printing is a raster image, which are lined up in a scanning order of the image output module.

In general, in order to reduce the time spent from inputting a PDL image to outputting to the image output module, the image is divided into a plurality of areas, and these areas are processed in parallel to reduce the time spent in the image processing of one page. Japanese Patent Application Laid-Open No. Hei 4-170686 discusses the image forming apparatus for forming an image by dividing a two-dimensional area to be rendered into a plurality of blocks, allocating the divided areas to a plurality of image generating means, and forming the image.

However, the image forming process discussed in Japanese Patent Application Laid-Open No. Hei 4-170686 does not consider the data inside each area in the image forming process. Therefore, even if the same data are present in the areas, the data is processed repeatedly, which leads to taking much time in the image formation.

SUMMARY OF THE INVENTION

An aspect of the present invention is directed to overcoming the above-described drawbacks.

According to one exemplary embodiment of the present invention, an image forming apparatus is provided which includes a conversion unit configured to convert page description language to page description language corresponding to a plurality of areas; a generating unit configured to generate image data based on the page description language converted by the conversion unit; a retaining unit configured to retain the page description language converted by the conversion unit and the image data generated by the generating unit; a comparing unit configured to compare the page description language retained at the retaining unit and the page description language converted by the conversion unit; and a selecting unit configured to select one of the image data generated by the generating unit and the image data retained at the retaining unit, depending on the comparison result by the comparing unit.

According to another exemplary embodiment of the present invention, a printing apparatus is provided which includes a conversion unit configured to convert print data to print data corresponding to a plurality of areas; a generating unit configured to generate image data based on the print data converted by the conversion unit; a retaining unit configured to retain the print data converted by the conversion unit and the image data generated by the generating unit; a comparing unit configured to compare the print data retained at the retaining unit and the print data converted by the conversion unit; a selecting unit configured to select one of the image data generated by the generating unit and the image data retained at the retaining unit, depending on the comparison result by the comparing unit; and a printing unit configured to produce a print based on a pixel map selected by the selecting unit.

According to yet another exemplary embodiment of the present invention, an image forming method is provided which includes converting page description language to page description language corresponding to a plurality of areas; generating image data based on the converted page description language; retaining in a memory the converted page description language and the generated image data; comparing the retained page description language and the converted page description language; and selecting one of the generated image data and the retained image data, depending on the comparison result.

According to still yet another exemplary embodiment of the present invention, an image forming apparatus is provided which includes a conversion unit configured to convert page description language to page description language corresponding to a plurality of areas; a generating unit configured to generate image data based on the page description language converted by the conversion unit; a retaining unit configured to retain the page description language converted by the conversion unit and the image data generated by the generating unit; a comparing unit configured to compare the page description language retained at the retaining unit and the page description language converted by the conversion unit; and an outputting unit configured to output to a memory the image data retained at the retaining unit if the page description language is determined to be matching by the comparing unit and outputs to the memory the image data generated by the generating unit if the page description language is determined to be unmatching by the comparing unit.

Moreover, according to another exemplary embodiment of the present invention, a printing apparatus is provided which includes a conversion unit configured to convert print data to print data corresponding to a plurality of areas; a generating unit configured to generate image data based on the print data converted by the conversion unit; and a retaining unit configured to retain the print data converted by the conversion unit and the image data generated by the generating unit; a comparing unit configured to compare the print data retained at the retaining unit and the print data converted by the conversion unit; an outputting unit configured to output to a memory the image data retained at the retaining unit if the print data is determined to be matching by the comparing unit and outputs to the memory the image data generated by the generating unit if the print data is determined to be unmatching by the comparing unit; and a printing unit configured to produce prints the image data output by the outputting unit.

Furthermore, according to yet another exemplary embodiment of the present invention, an image forming method is provided which includes converting page description language to page description language corresponding to a plurality of areas; generating image data based on the converted page description language; retaining the converted page description language and the generated image data; comparing the retained page description language retained and the converted page description language; and outputting to a memory the retained image data if the page description language is determined to be matching in the comparing step and outputting to the memory the generated image data if the page description language is determined to be unmatching in the comparing step.

Also, according to another aspect of the aforementioned exemplary embodiments, the area includes an area where one page is divided in two directions. And, according to another aspect of the aforementioned exemplary embodiments, the area includes an area where one page is divided in one direction.

Further embodiments, features and aspects of the present invention will become apparent from the following detailed description with reference to the attached drawings.

BRIEF DESCRIPTION OF THE DRAWINGS

The accompanying drawings, which are incorporated in and constitute apart of the specification, illustrate exemplary embodiments of the invention and, together with the description, serve to explain the principles of the invention.

FIG. 4 is print data of FIG. 3 in accordance with the exemplary embodiment of the present invention.

FIG. 5 is the print data of tile (1, 3) in accordance with the exemplary embodiment of the present invention.

FIG. 6 is the print data of tiles (1, 1) and (1, 2) in accordance with the exemplary embodiment of the present invention.

FIG. 7 is the print data of strip 3 in accordance with the exemplary embodiment of the present invention.

DETAILED DESCRIPTION OF THE EXEMPLARY EMBODIMENTS

Exemplary embodiments, features and aspects of the present invention will now be herein described in detail below with reference to the drawings.

Figure 1:
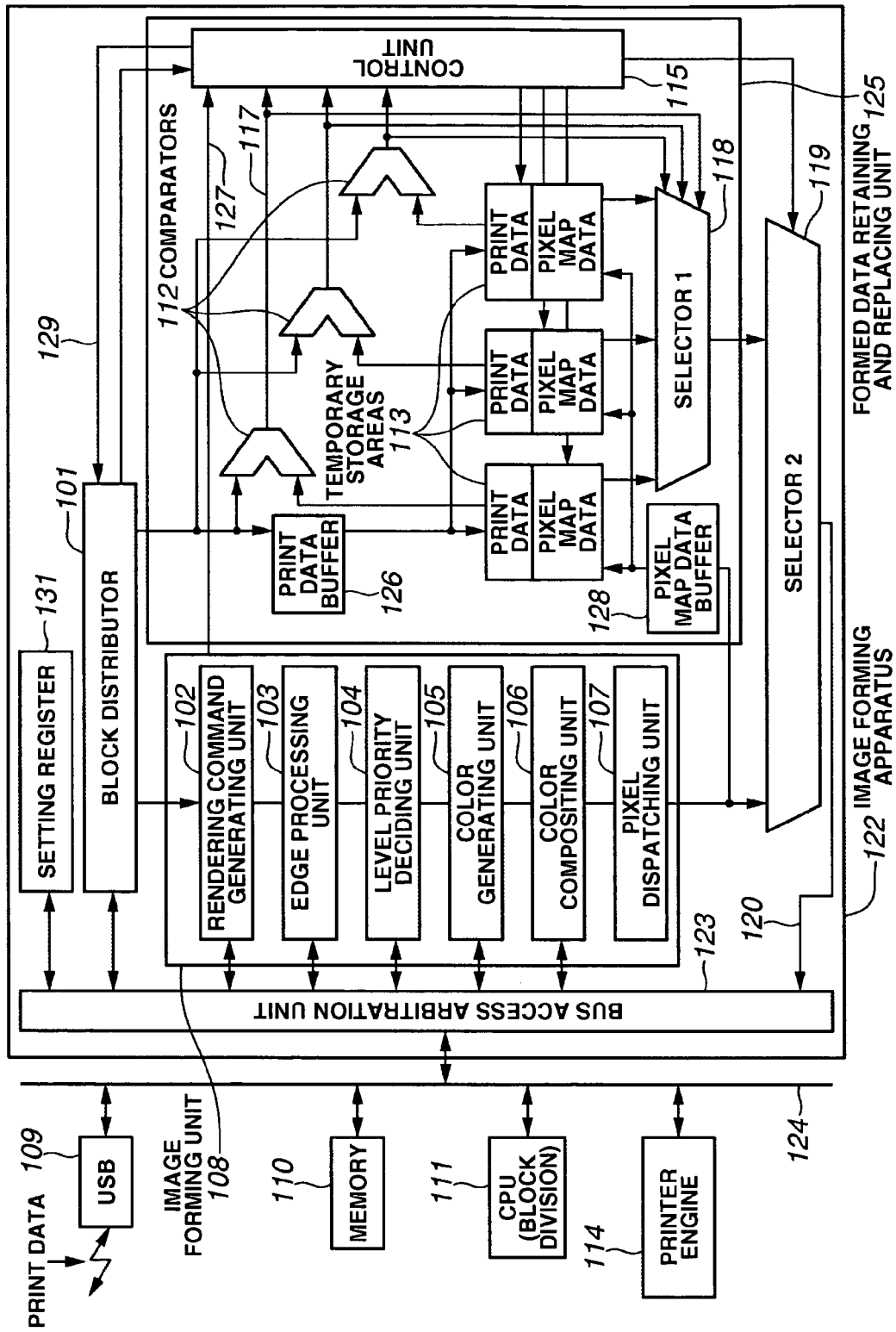
FIG. 1 is an example configuration of an image forming apparatus according to a first exemplary embodiment of the present invention.

FIG. 1 shows an exemplary embodiment of the image forming apparatus of the present invention. The image forming apparatus 122 is connected to a bus 124 via a bus access arbitration unit 123. The bus 124 is further connected to a communication interface 109 typified by USB, a memory 110 that temporarily stores all data necessary for processing, and a CPU 111 that performs the print data processing, and controls the whole apparatus. Further, for a communication interface, LAN (local area network) interface or wireless interface may also be used.

The image forming apparatus 122 includes a block distributor 101, an image forming unit 108, a formed data retaining and replacing unit 125, a selector 119, and the bus access arbitration unit 123. The block distributor 101 reads and duplicates successively the print data of a rectangular unit which is divided to a plurality of rectangular shapes by the method which will be described later. The block distributor 101 distributes the print data to both the formed data retaining and replacing unit 125 and the image forming unit 108. Normally, it performs a termination operation after reading one page of the print data after activation.

The image forming unit 108 employs the configuration that forms the pixel map data by successively processing the print data inputted at each of the following processing units: a rendering command generating unit 102, an edge processing unit 103, a level priority deciding unit 104, a color generating unit 105, a color compositing unit 106, and a pixel dispatching unit 107. Specific explanation follows below.

The rendering command generating unit 102 reads a job by accessing to the system bus 124, and issues a rendering command. The edge processing unit 103 reads an edge record included in the job according to the rendering command issued by the rendering command generating unit 102, extracts edge information of the rendering object in a scanning line unit, and transfers as a message the edge information to the level priority deciding unit 104 after sorting the edge information in ascending order in a scanning line direction (the X coordinate direction).

The level priority deciding unit 104 reads the edge information transferred from the edge processing unit 103 and a level table included in the job, in accordance with the rendering command issued by the rendering command generating unit 102. This is followed by the processes of deciding a priority of each level and an activated pixel region (i.e. the region which influences the rendering) per scanning line, sorting in the priority order the information of the activated pixel region per scanning line, determining the pixel region information along with relevant information together with pixel of the other level, and transferring the pixel region information to the color generating unit 105.

The color generating unit 105 follows the rendering command issued by the rendering command generating unit 102, and reads the pixel region information transferred from the level priority deciding unit 104 and the fill table included in the job. This is followed by the processes of determining the color of activated pixel per level, and transferring to the color mixing unit 106 the color information of the activated pixel along with the pixel region information transferred from the level priority deciding unit 104.

The color mixing unit 106 follows the rendering command issued by the rendering command generating unit 102, and executes calculation for determining the color in a pixel unit, based on the color information of the pixel determined by the color generating unit 105 and the pixel region information of each level generated by the level priority deciding unit 104. Thus, the color mixing unit 106 generates the final color of the pixel.

The pixel dispatching unit 107 rasterizes the pixel information expressed in a run length format to a pixel among the final color of the pixel generated by the color mixing unit 106, and transfers it to a memory 110 or pixel map buffer 128.

Internal modules of the block distributor 101 and the image forming unit 108 (the rendering command generating unit 102, the edge processing unit 103, the level priority deciding unit 104, the color generating unit 105, the color compositing unit 106, the pixel dispatching unit 107) are ideally configured as the specialized hardware modules or separate processors. However, these elements can also be configured by the software.

It is noted that the shown configuration of the image forming unit 108 is not intended to limit the configuration of the present invention. Different configuration and rendering methods may be used as required. Moreover, even in the case of outputting the compressed image data from the image forming unit 108 other than the non-compressed pixel map data, the similar method may be adopted. In this case, the print data is associated with the compressed pixel map data. Moreover, in addition to the configuration described in the present patent, as for the image forming unit 108 to be employed in an actual project, a module for rasterizing the compressed image may be placed between the color generating unit 105 and the color mixing unit 106.

Still referring to FIG. 1, the formed data retaining and replacing unit 125 includes a temporary storage area 113, a comparator 112, a control unit 115 and a selector 118. The temporary storage area 113 retains a combination of a divided print data (the print data) and a result of image formed from the print data (pixel map data). The comparator 112 compares the print data already retained and the print data newly input. The control unit 115 controls replacing of the print data, outputting and replacing of the pixel map data, based on the comparison result. The selector 118 selects data that matches the print data when outputting data retained at the temporary storage area.

Various operational scenarios and examples of the image forming apparatus according to the present invention will now be explained below in order from a point when the print data is input in a page unit by the USB interface.

Input Print Data

Normally, the print data is input from a host computer and the like via the communication interface in a text unit constructed of a single or plurality of pages. In the present exemplary embodiment, one page of print data is stored on the memory 110 via the USB end point DMA attached thereto. The USB interface 109 is previously activated, and when the print data arrives, it is transferred by DMA to the specified area on the memory 110 via the bus 124. After that, the data arrival is notified to the CPU 111 by the communication means (not illustrated) such as interrupt.

Figure 3:
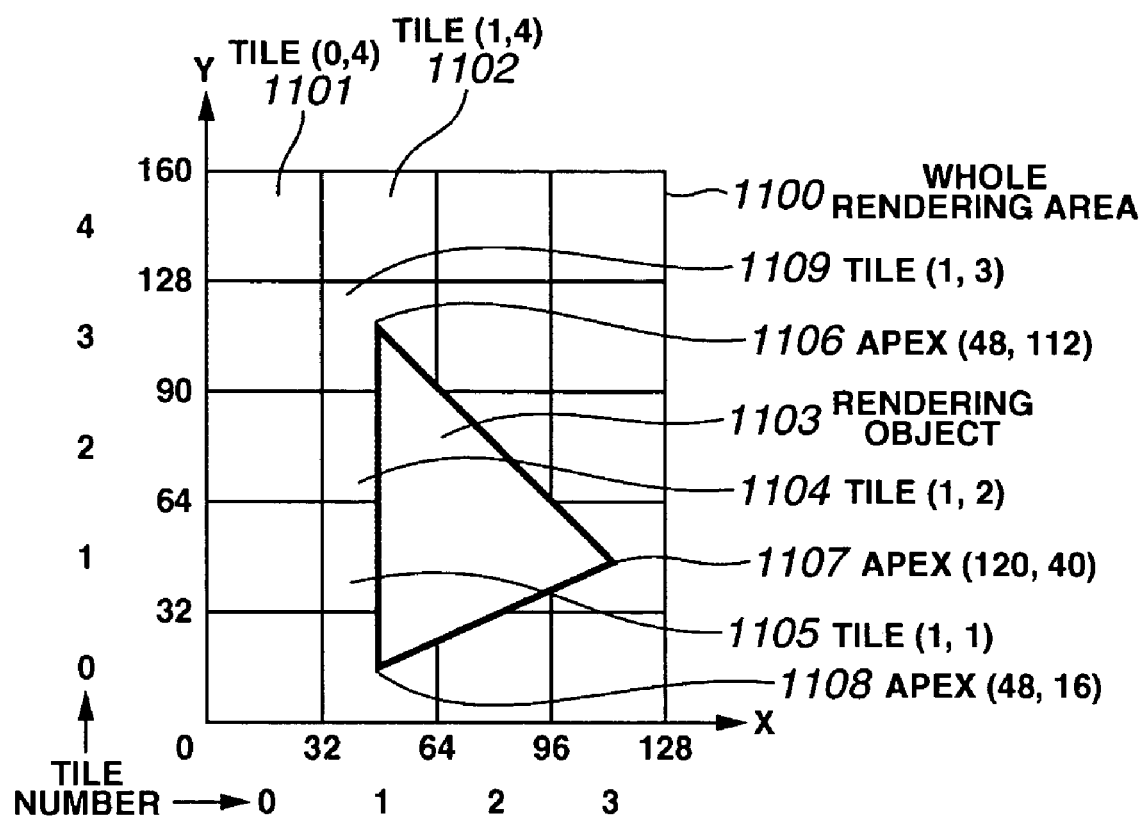
FIG. 3 is an example of rendering data in accordance with the exemplary embodiment of the present invention.

The present exemplary embodiment describes, as an example, the case where the tile-divided print data of FIG. 3 is input. Further, also in the case of dividing in a line unit or strip unit, by changing the tile processing of the present exemplary embodiment to the line or strip unit processing, the image forming apparatus equivalent to the case of the tile processing can be constructed.

Divide Print Data Block

Operation outline of the rendering apparatus of FIG. 1 is described below. Processing the data described in PDL that corresponds to the image in FIG. 3 is performed as an example. In FIG. 3, a whole rendering area 1100 is defined by a tile grid, where each tile has a tile coordinate, such as (0,4) for tile 1101 and (1,4) for tile 1102. For exemplary purposes, a triangular object 1103 is rendered in FIG. 3 within the rendering area 1100. The triangular object 1103 is defined by three apexes 1106, 1107 and 1108 each having specific coordinates (48, 112), (120, 40) and (48, 16), respectively. It is noted, for instance, that apex 1106 is positioned within tile 1109 which has tile coordinate (1,3). While it is further noted that portions of a vertically oriented side of the triangle 1103 are formed within tiles 1104, 1105 having respective tiles coordinates (1,2) and (1,1).

FIG. 4 shows one example of the print data described in Post Script language for the image shown in FIG. 3. To start, a pen-coordinate is moved to (X, Y)=(48, 112) by move to command. From here, straight lines are drawn by connecting the coordinates (48, 16), (120, 40), (48, 112) in the order by the line to command so that a triangle is rendered.

According to the image forming apparatus shown in FIG. 1, the print data input from the external interface (109) such as USB and stored on the memory 110 is divided into a plurality of rectangular areas to perform rendering in high speed, and the format is converted to the print data of their respective rectangular areas. Conversion from PDL of whole rendering area shown in FIG. 4 to PDL of tile area shown in FIG. 5 is executed by a simple coordinate calculation.

Herein below, an example of the tile division of PDL by the CPU 111 of FIG. 1 is described. The input PDL (FIG. 4) shows that regarding the apex 1106 (coordinate 48, 112) of the object 1103 of FIG. 3, no rendering object exists in the area smaller than x-coordinate=48 and the area larger than y-coordinate=112. Accordingly, in the case of dividing the whole page to tiles of 32×32 pixels, no object is present in the tile numbers (x, y)=(0, 4), (1, 4), (2, 4), (3, 4), (0, 3), (0, 2), (0, 1), (0, 0). All of the print data after performing these tile division are simply constructed only by a rendering command and specified background color (such as 100 setbgcolor, fill, showpage).

Further, as for the tile (1, 3), the object is seen to be present inside the tile, so that a vector inclination drawn from the apex 1106 is obtained. A coordinate is obtained where a straight line drawn from the apex coordinate inside the tile intersects the tile boundary, and the new print data of the tile unit is generated.

In general, the coordinate A' (x', y') after the conversion of the apex A (x, y) is: x'=X-coordinate of apex A (x)−tile number in X-direction X pixel number of one tile in X-direction y'=Y-coordinate of apex A (y)−tile number in X-direction X pixel number of one tile in Y-direction The coordinate (x', y') after the conversion of the apex 1106 included in the tile (1, 3) is, provided that:

X-coordinate of apex A=48

Y-coordinate of apex A=112 tile number in X-direction=1 tile number in Y-direction=3 pixel number of 1 tile in X-direction=pixel number of 1 tile in Y-direction=32, as follows:

$$x'=48-1\times32=16$$

$$y'=112-3\times32=16$$

Figure 9:
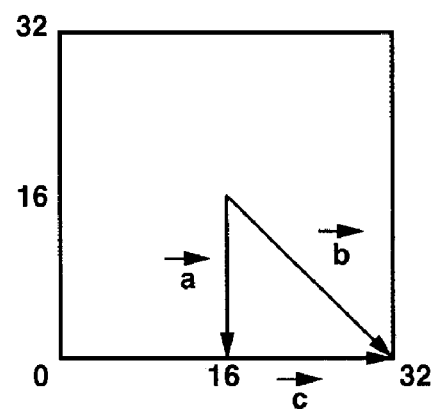
FIG. 9 is a drawing of the object after tile division in accordance with the exemplary embodiment of the present invention.

A vector with the apex 1106 as its endpoint has an infinite slope in the vertical direction. The right slope vector is defined as (112−40)/(48−120)=−1. Accordingly, as shown in FIG. 9, where a lower left is a base point, an object in a tile is converted to a vector a extending straight down from an apex (16, 16) as a starting point to the tile boundary, a vector b having the inclination=−1 and extending to an intersecting point of x=32 or y=0, and a vector c extending from the intersecting point of the vector a and the tile boundary to (32, 0). (In the example of this case, no vector is present from the vector b to (32, 0) because the endpoint of the vector b is (32, 0)). Postscript after the conversion is carried out is expressed as in FIG. 5.

Now, the case where the inputted PDL is divided in a strip unit is considered. In this case, the calculation in y-direction in the tile division is omitted. In this case, the coordinate (x', y') within the strip after the conversion of the apex 1106 is as follows:

$x'$=X-coordinate of apex(x)=48

$y'$=Y-coordinate of apex(y)–tile number 3×32 pixels of one tile in Y-direction=16

Figure 10:
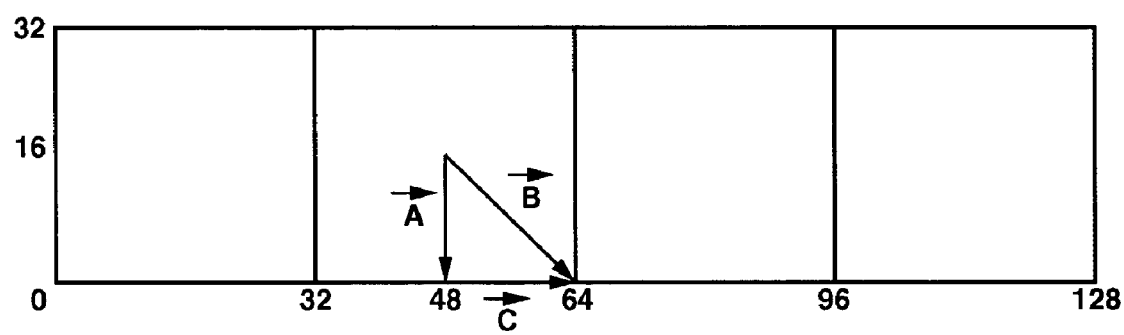
FIG. 10 is the object after band division in accordance with the exemplary embodiment of the present invention.

As shown in FIG. 10, an object in a strip having an apex (48, 16) as a starting point, is converted to a vector A extending straight down to the strip boundary, a vector B having the inclination=−1 extending to an intersection with y=0, and a vector C connecting the intersecting points of the two vectors and the strip boundary. Post Script after the conversion is expressed as in FIG. 7. Moreover, to make division in a line unit, the intersecting point of the object with respect to a certain y-coordinate may be obtained.

Each area divided in tile/strip/line unit using any one of the above methods is hereafter called a block. When the block division of the print data by the CPU 111 is finished, the control software sets storing position of the divided print data to the block distributor 101 connected to the image forming apparatus 108, and activates the image forming apparatus 108.

When the tile division is performed, the block distributor 101 supplies the print data to the image forming apparatus successively starting from a tile number (0, 0). The image forming apparatus outputs the pixel map data formed after performing a series of rendering processes. Likewise, the similar processings are performed from a block number 0 in the case of the block division, and from a line number 0 in the case of the line division, respectively. In the present example, the generated pixel map data is stored on the memory 110, and is output to the printer engine 114 and the like. In the present exemplary embodiment, print is output by the printer engine such as an ink jet method and electronic photographing method, however, it may also be output and displayed in a display such as CRT or LCD.

According to the above described method, one page of the print data divided per tile is prepared. The technique of evaluating objects per tile when a plurality of objects are present in a page and the technique of dividing the curvature are already applied for in Japanese Patent Application No. 2005-036859.

Activating Image Forming Apparatus

After the CPU 111 finishes the block division of the print data, it initializes a memory inside the temporary storage area 113 and a setting register 131 inside the image forming apparatus. Then, the block distributor 101 of FIG. 1 is activated. Thus, the image forming apparatus 122 of the present invention starts its operation. Further, the setting register 131 may be included in the image forming apparatus 108 or control unit 115.

Image Forming Process

The block distributor 101 reads the print data divided in a tile unit, and distributes and supplies them to the formed data retaining and replacing unit 125 and the image forming unit 108. The image forming unit 108 processes the print data using the known technique and generates the pixel map data. On the other hand, at the formed data retaining and replacing unit 125, three comparators 112 simultaneously compare the print data retained at the temporary storage areas 113 and the print data input by the block distributor 101.

In the present exemplary embodiment, 128-bits comparator is used to successively keep on comparing the print data stored on the temporary storage area 113 and the print data supplied from the block distributor 101, from the head. The comparator validates the match signals 117 as long as they match with each other and notifies them to the control unit 115. Once the unmatch occurs, the match signal 117 is invalidated, and does not output the match signal 117 from the block distributor 101 until the new print data is supplied. As a result, it is determined that the comparison result is matching when the match signal 117 is valid after reading the print data is finished.

Generally, in the process executed by the rendering command generating unit, time is required for analyzing and generating the command after input of the print data is finished. Processing time is also required for the later rendering process depending on a degree of complexity of a figure. Accordingly, the comparison result by the comparator is determined faster than the rendering process of the image forming unit 108.

Figure 2:
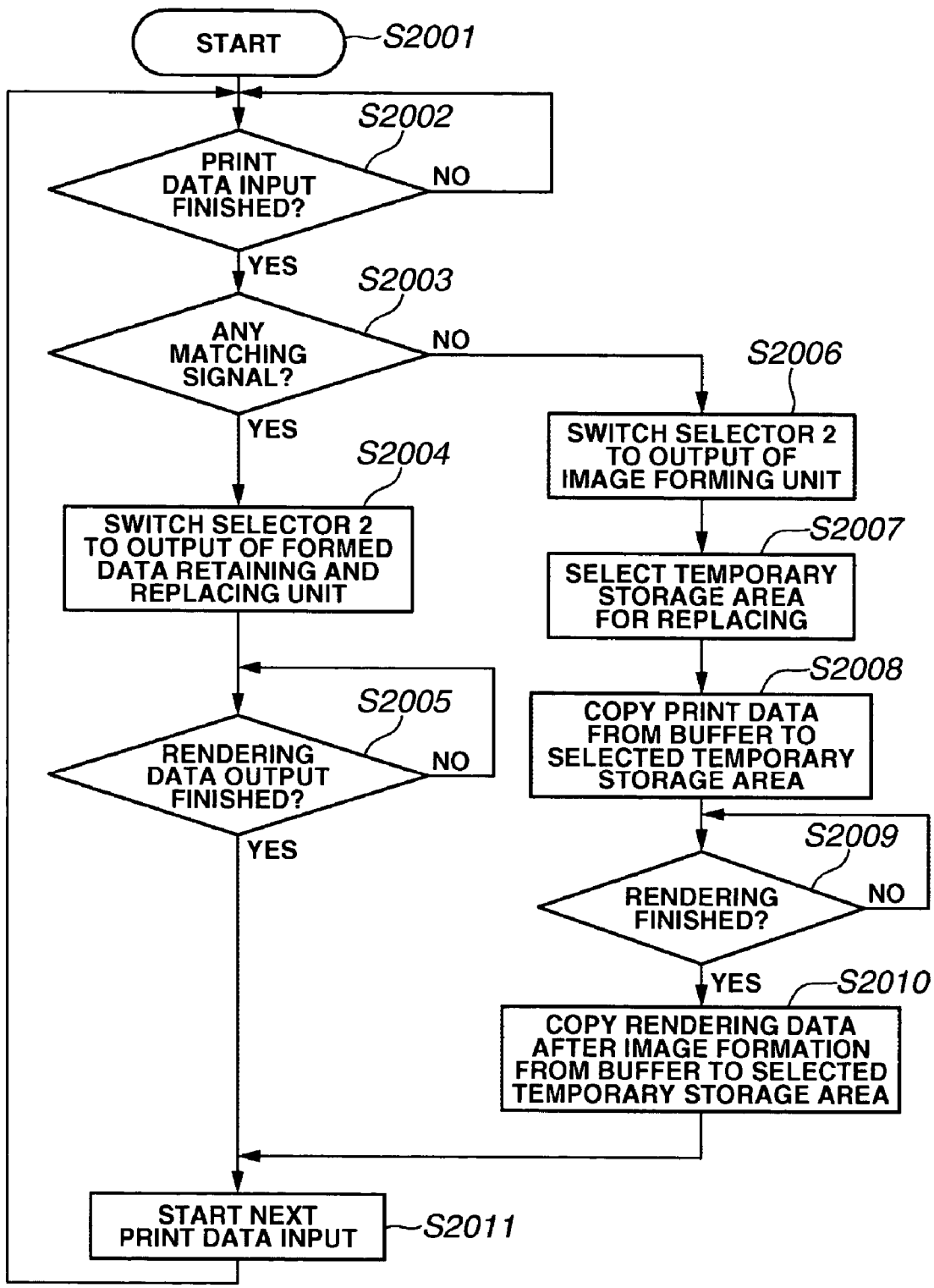
FIG. 2 is an example operational flow of a control unit in accordance with the exemplary embodiment of the present invention.

The process in the control unit 115 is shown in FIG. 2. The process is initiated at S2001. When the process starts at the control unit 115, in step S2002, the process waits for the block distributor 101 to finish reading the print data of one tile. The print data of one tile is temporary stored on the print data buffer 126 while reading is being carried out. When reading of the print data is finished, the process checks whether the match signal 117 is present in step S2003. If the operation is normal, the match signals 117 are all invalid or only one is valid. If a plurality of match signals 117 are valid, process such as abnormality termination may be performed.

If the match signal 117 is present, in step S2004, the selector 2 is switched. The pixel map data output from the formed data retaining and replacing unit 125 is output to the bus access arbitration unit 123 via the output bus 120 as the processing result of the image forming apparatus 122, and the process advances to step S2005.

In the present exemplary embodiment, a selection of the rendering data stored in the three temporary storage areas 113 is already performed by the comparison result signal 117 that is directly connected to the selector 1 (118). This selection may also be performed by the control apparatus 115. The bus access arbitration unit 123 that has received the pixel map data writes the data to the previously set area on the memory 110. In step S2005, the process waits until the outputting of the rendering data is finished. When the outputting is finished, the process advances to S2011, and an instruction is given to the block distributor 101 to read print data of the next tile by the print data read instructing signal 129.

After that, the process returns to step S2002, and waits until inputting of the next tile print data is finished. The process advances from S2003 to S2006 if no match signal 117 is found, and the selector 2 is switched to output of the image forming unit 108. Outputting of the pixel map data of result image forming apparatus 122 is performed by the known image forming technique. In step S2007, one of three temporary storage areas 113 is selected for replacing. In the present exemplary embodiment, by a round robin method the adjoining temporary storage area is selected for next replacing every time the rewriting occurs.

In step S2008, the print data is stored on the temporary storage area selected in step S2007. This process is performed by copying the print data stored temporarily on the print data buffer 126. In step S2009, the process waits until the image forming at the image forming unit 108 is finished while monitoring an image forming unit process finishing signal 127. The process advances to step S2010 when the image formation is finished. Similar to the print data, the pixel map data stored on the pixel map data buffer 128 is copied to the selected temporary storage area. The process advances to step S2011 when the copying is finished, and an instruction is given to the block distributor 101 to read the next tile print data of next tile by a print data read instructing signal 129. Then, the process returns to step S2002 and waits until inputting of the print data of next tile is finished.

Figure 8:
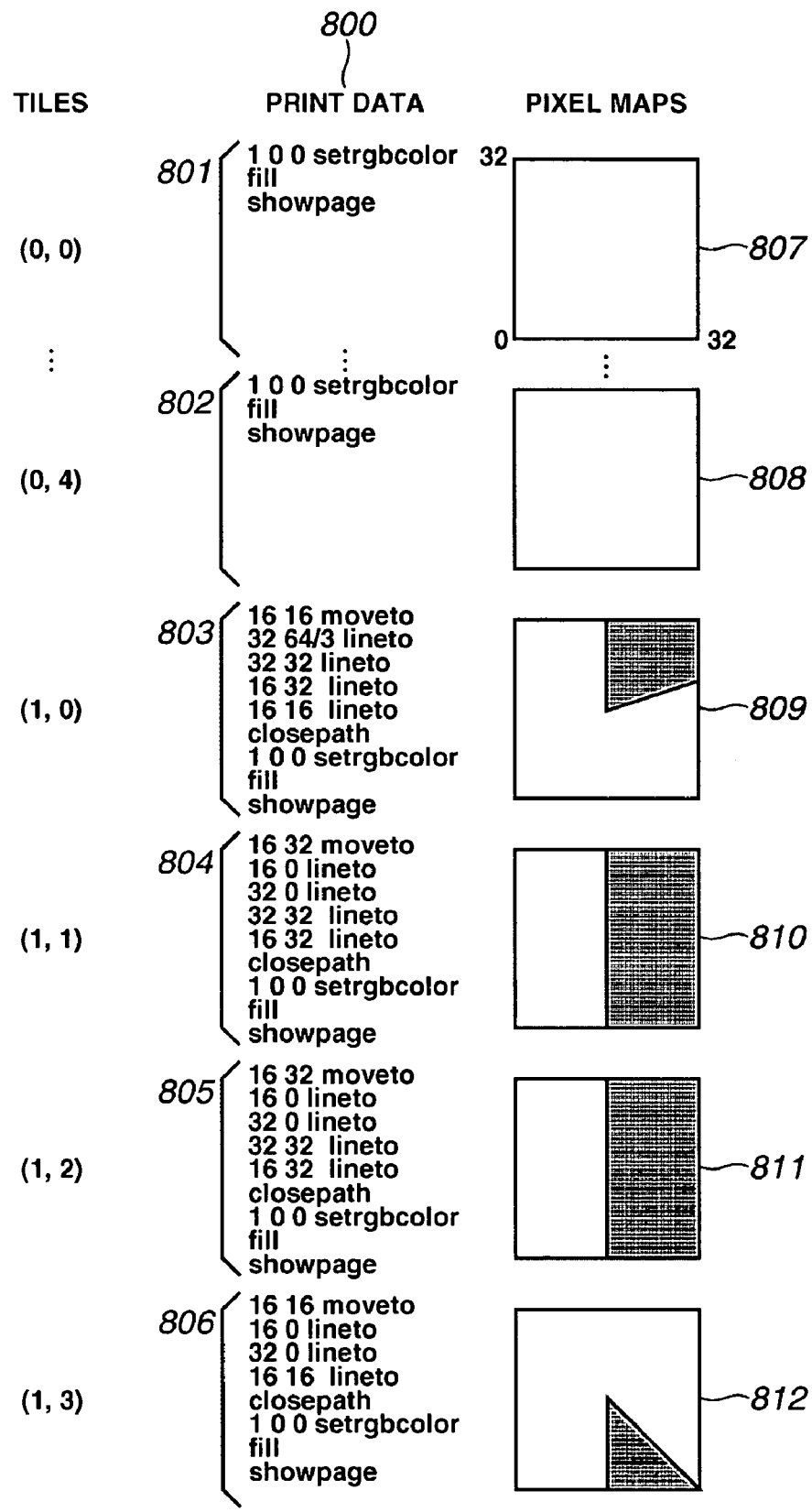
FIG. 8 is pixel maps and the print data for each tile in accordance with the exemplary embodiment of the present invention.

According to the operation as described above, in the image forming apparatus of the present exemplary embodiment, for example, if an image of FIG. 3 is input as the print data shown in FIG. 4, the CPU 111 divides it into 20 tiles having the tile numbers (0, 0) to (3, 4), generates 20 print data (from 801 to 806 . . . ) for each tile as shown by reference numeral 800 of FIG. 8, stores them to the memory 110, and stores the storing position of the print data of each tile to the tile distributor 101.

Next, the tile distributor 101 reads the print data of tile numbers (0, 0)→(0, 1)→(0, 2)→(0, 3)→(0, 4)→(1, 0)→(1, 1)→(1, 2) . . . to the image forming apparatus 122 and the image formation is performed. Because the tile (0, 0) is the first tile, it is rendered by the image forming unit 108, and a blank pixel map data 807 is generated. The print data 801 of the tile (0, 0) and the pixel map data 807 are stored on the first temporary storage area 113 in accordance with the operation of the control unit described above. Because no object is present for the second tile (0, 1) either, the print data 801 of the tile (0, 0) match with the print data 802. Based on the operation of the control unit described above, the data 807 of the already rendered tile (0, 0) is output as the pixel map data 808 of the image forming apparatus. Also for the tiles (0, 2) (0, 3) (0, 4), no rendering process is performed which is time-consuming.

Returning to the lowermost tile once again, at the tile (1, 0), the print data 803 does not match the data retained at the temporary storage area. Accordingly, the rendering process is performed by the image forming unit 108, a pixel map 809 is generated, and the print data 803 and the pixel map 809 are stored on the second temporary storage area 113. Next, as for the tile (1, 1), the print data 804 does not match the data retained at the temporary storage area. Accordingly, the rendering process is performed by the image forming unit 108, a pixel map 810 is generated, and the print data 804 and the pixel map 810 are stored in the third temporary storage area 113.

Next, as for the tile (1, 2), the print data 805 and pixel map 811 is identical to the print data 804 of the tile (1, 1) in the temporary storage area. Accordingly, the process does not wait until the rendering process is finished, and the rendered data 810 is output from the temporary storage area. Next, as for the tile (1, 3), the print data 806 does not match the data retained at the temporary storage area. Accordingly, the rendering process is performed by the image forming unit 108, and the pixel map data 812 is generated. Because all of the three temporary storage areas 113 for storing the print data and pixel map data are being used, the print data 806 and pixel map 812 are written over the first temporary storage area 113. The above operations are repeated until outputting of the rendering data of the tile (3, 4) is finished.

As described above, according to the exemplary embodiments of the present invention, the image forming time is shortened. Moreover, during the process of forming the image from the print data typified by PDL, the print data which has finished the rendering and the print data for rendering hereafter are compared. When the print data match with each other, it is possible to output the rendered data that is retained instead of performing the time-consuming analyzing and rendering processes. That is, there is no need to perform the image formation of the print data that has once been rendered so that a high-speed image formation is implemented. Especially, when the image formation is performed by dividing a page into a plurality of tiles, it becomes possible to reduce the amount of rendering data formed at the image forming unit. Therefore it becomes possible to reduce the image formation time of one page which was difficult to achieve with the conventional technique. Moreover, in most cases, the image formation process is typically carried out by a high-speed hardware calculation apparatus, so that the energy consumption is effectively reduced by stopping the image formation when the print data matches.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-109835 filed Apr. 6, 2005, which is hereby incorporated by reference herein in its entirety.

What is claimed is:

1. An image forming apparatus comprising:
    a conversion unit configured to convert page description language to page description language corresponding to a plurality of areas;
    a generating unit configured to generate image data based on the page description language convened by the conversion unit;
    a retaining unit configured to retain the page description language convened by the conversion unit and the image data generated by the generating unit;
    a comparing unit configured to compare the page description language retained at the retaining unit and the page description language convened by the conversion unit; and
    a selecting unit configured to select the image data retained at the retaining unit in case the page description language converted by the conversion unit in response to the comparison by the comparing unit and the page description language retained at the retaining unit correspond with each other, and select the image data generated by the generating unit in case the page description language converted by the conversion unit in response to the comparison by the comparing unit and the page description language retained at the retaining unit do not correspond with each other.

2. The image forming apparatus according to claim 1, wherein the area includes an area where one page is divided in two directions.

3. The image forming apparatus according to claim 1, wherein the area includes an area where one page is divided in one direction.

4. A printing apparatus comprising:
    a conversion unit configured to convert print data to print data corresponding to a plurality of areas;
    a generating unit configured to generate image data based on the print data convened by the conversion unit;
    a retaining unit configured to retain the print data converted by the conversion unit and the image data generated by the generating unit;
    a comparing unit configured to compare the print data retained at the retaining unit and the print data converted by the conversion unit;
    a selecting unit configured to select the image data retained at the retaining unit in case the print data converted by the conversion unit in response to the comparison by the comparing unit and the print data retained at the retaining unit correspond with each other, and select the image data generated by the generating unit in case the print data converted by the conversion unit in response to the comparison by the comparing unit and the print data retained at the retaining unit do not correspond with each other; and a printing unit configured to produce a print based on the formed image data for one page in the memory a pixel map selected by the selecting unit.

5. The printing apparatus according to claim 4, wherein the area includes an area where one page is divided in two directions.

6. The printing apparatus according to claim 4, wherein the area includes an area where one page is divided in one direction.

7. An image forming method comprising:
convening page description language to page description language corresponding to a plurality of areas;
generating image data based on the convened page description language;
retaining in a memory the convened page description language and the generated image data;
comparing the retained page description language and the converted page description language;
selecting the retained image data in case the converted page description language in response to the comparison and the retained page description language correspond with each other, and selecting the generated image data in case the converted page description language in response to the comparison and the retained page description language do not correspond with each other.

8. The image forming method according to claim 7, wherein the area includes an area where one page is divided in two directions.

9. The image forming method according to claim 7, wherein the area includes an area where one page is divided in one direction.

10. An image forming apparatus comprising:
a conversion unit configured to convert page description language to page description language corresponding to a plurality of areas;
a generating unit configured to generate image data based on the page description language convened by the conversion unit;
a retaining unit configured to retain the page description language convened by the conversion unit and the image data generated by the generating unit;
a comparing unit configured to compare the page description language retained at the retaining unit and the page description language convened by the conversion unit;
an outputting unit configured to output the image data retained at the retaining unit in case the page description language converted by the conversion unit in response to the comparison by the comparing unit and the page description language retained at the retaining unit correspond with each other, and output the image data generated by the generating unit in case the page description language converted by the conversion unit in response to the comparison by the comparing unit and the page description language retained at the retaining unit do not correspond with each other.

11. The image forming apparatus according to claim 10, wherein the area includes an area where one page is divided in two directions.

12. The image forming apparatus according to claim 10, wherein the area includes an area where one page is divided in one direction.

13. A printing apparatus comprising:
a conversion unit configured to convert print data to print data corresponding to a plurality of areas;
a generating unit configured to generate image data based on the print data convened by the conversion unit; and
a retaining unit configured to retain the print data converted by the conversion unit and the image data generated by the generating unit;
a comparing unit configured to compare the print data retained at the retaining unit and the print data converted by the conversion unit;
an outputting unit configured output the image data retained at the retaining unit in case the print data converted by the conversion unit in response to the comparison by the comparing unit and the print data retained at the retaining unit correspond with each other, and output the image data generated by the generating unit in case the print data converted by the conversion unit in response to the comparison by the comparing unit and the print data retained at the retaining unit do not correspond with each other; and
a printing unit configured to produce prints the image data output by the outputting unit.

14. The printing apparatus according to claim 13, wherein the area includes an area where one page is divided in two directions.

15. The printing apparatus according to claim 13, wherein the area includes an area where one page is divided in one direction.

16. An image forming method comprising:
convening page description language to page description language corresponding to a plurality of areas;
generating image data based on the convened page description language;
retaining the convened page description language and the generated image data;
comparing the retained page description language retained and the convened page description language; and
outputting the retained image data in case the converted page description language in response to the comparison and the retained page description language correspond with each other, and outputting the generated image data in case the converted page description language in response to the comparison and the retained page description language do not correspond with each other.

17. The image forming method according to claim 16, wherein the area includes an area where one page is divided in two directions.

18. The image forming method according to claim 16, wherein the area includes an area where one page is divided in one direction.

* * * * *